United States Patent
Yang et al.

(10) Patent No.: US 10,560,233 B2
(45) Date of Patent: Feb. 11, 2020

(54) INTERLACE PATTERN SELECTION FOR LOW CM/PAPR TRANSMISSION

(71) Applicant: Telefonaktiebolaget LM Ericsson (publ), Stockholm (SE)

(72) Inventors: Yu Yang, Solna (SE); Fredrik Lindqvist, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/060,624

(22) PCT Filed: Dec. 8, 2016

(86) PCT No.: PCT/SE2016/051232
§ 371 (c)(1),
(2) Date: Jun. 8, 2018

(87) PCT Pub. No.: WO2017/099659
PCT Pub. Date: Jun. 15, 2017

(65) Prior Publication Data
US 2019/0013905 A1    Jan. 10, 2019

Related U.S. Application Data

(60) Provisional application No. 62/264,617, filed on Dec. 8, 2015.

(51) Int. Cl.
*H04L 5/00* (2006.01)
*H04L 27/00* (2006.01)
*H04W 72/04* (2009.01)

(52) U.S. Cl.
CPC .......... *H04L 5/003* (2013.01); *H04L 27/0006* (2013.01); *H04W 72/0453* (2013.01)

(58) Field of Classification Search
CPC ..... H04L 5/003; H04L 27/0006; H04L 5/001; H04L 27/2614; H04W 72/0453
See application file for complete search history.

(56) References Cited

U.S. PATENT DOCUMENTS

2007/0280365 A1* 12/2007 Seki ..................... H04L 5/0046
                                                                375/260
2012/0106408 A1*  5/2012 Papasakellariou .... H04L 1/1614
                                                                370/280
2013/0029677 A1   1/2013 Baligh et al.
(Continued)

FOREIGN PATENT DOCUMENTS

WO    2015042396 A1    3/2015

OTHER PUBLICATIONS

3rd Generation Partnership Project; Technical Specification Group Radio Access Network; Evolved Universal Terrestrial Radio Access (E-UTRA); Physical channels and modulation (Release 11), 3GPP TS 36.211 V11.4.0, Sep. 2013, pp. 1-120.
(Continued)

*Primary Examiner* — Mehmood B. Khan
(74) *Attorney, Agent, or Firm* — Sage Patent Group

(57) ABSTRACT

There is disclosed a network node (100) for a wireless communication network. The network node (100) is adapted for performing interlacing based on a time and/or frequency structure and/or resource structure. There are also disclosed related devices and methods.

9 Claims, 13 Drawing Sheets

(56) References Cited

U.S. PATENT DOCUMENTS

| | | | | |
|---|---|---|---|---|
| 2013/0194951 | A1* | 8/2013 | Kim | H04W 72/005 |
| | | | | 370/252 |
| 2015/0085797 | A1* | 3/2015 | Ji | H04J 3/16 |
| | | | | 370/329 |
| 2015/0092702 | A1* | 4/2015 | Chen | H04W 72/082 |
| | | | | 370/329 |
| 2015/0111505 | A1* | 4/2015 | Kim | H04L 5/005 |
| | | | | 455/67.13 |
| 2015/0156638 | A1* | 6/2015 | Yerramalli | H04W 16/14 |
| | | | | 455/454 |
| 2015/0365880 | A1* | 12/2015 | Malladi | H04L 5/0007 |
| | | | | 370/312 |
| 2016/0352478 | A1* | 12/2016 | Jia | H04L 27/2601 |
| 2017/0111894 | A1* | 4/2017 | Chen | H04L 5/0048 |

OTHER PUBLICATIONS

3rd Generation Partnership Project; Technical Specification Group Radio Access Network; Evolved Universal Terrestrial Radio Access (E-UTRA); Physical layer procedures (Release 11), 3GPP TS 36.213 V11.4.0, Sep. 2013, pp. 1-182.

"Further Details on PHY Layer Options for LAA", 3GPP TSG RAN WG1 #81; R1-152791; Fukuoka, Japan, May 25-29, 2015, pp. 1-7.

"Support of UL transmission for LAA", Huawei, HiSilicon, 3GPP TSG RAN WG1 Meeting #80bis, R1-151302, Belgrade, Serbia, Apr. 20-24, 2015, pp. 1-6.

"Uplink Waveform for LAA", Qualcomm Incorporated, 3GPP TSG RAN WG1 #81, R1-152790, Fukuoka, Japan, Apr. 25-29, 2015, pp. 1-4.

\* cited by examiner

INTERLACE PATTERN SELECTION FOR LOW CM/PAPR TRANSMISSION

TECHNICAL FIELD

The present disclosure pertains to wireless communication technology. The proposed approaches are particularly suitable for the physical layer for wireless communication.

BACKGROUND

The development in wireless communication technology currently indicates increasing use of new and different regions of the frequency spectrum for new applications and systems. In particular if techniques used for already used spectrum are utilised in new spectrum, there may arise issues limiting their efficiencies, which may be related to physical characteristics (e.g., different absorption in different frequency ranges), and/or to different regulations, e.g. for unlicensed spectrum in comparison to licensed spectrum. Such issue may require adapted approaches, e.g. for transmitting. However, such approaches should not overly deviate from proven and widely implemented approaches, in particular in the context of well-established standards, e.g. 3GPP LTE and similar.

SUMMARY

This disclosure provides approaches and concepts facilitating improved transmission behaviour, in particular for transmission in unlicensed spectrum, e.g. in the uplink, without being limited thereto. It is generally suggested utilising, e.g. by a wireless transmitter like a network node or terminal, interlacing for transmitting, which allows adapting the transmission characteristics (in particular regarding CM and/or PAPR) in a desirable way.

In particular, there is disclosed a network node for a wireless communication network. The network node may be adapted for utilizing a pre-defined time/frequency structure and/or resource structure for transmission. Generally, the network node is adapted for performing interlacing based on a time and/or frequency structure and/or resource structure.

There is also disclosed a method for operating a network node in a wireless communication network. The network node may be adapted for utilizing a pre-defined time/frequency structure and/or resource structure for transmission. The method comprises performing interlacing based on a time and/or frequency structure and/or resource structure.

Moreover, a terminal for a wireless communication network is discussed. The terminal may be adapted for utilizing a pre-defined time/frequency structure and/or resource structure for transmission. Generally, the terminal is adapted for performing interlacing based on the time and/or frequency structure and/or resource structure.

A method for operating a terminal in a wireless communication network is considered. The terminal may be adapted for utilizing a pre-defined time/frequency structure and/or resource structure for transmission. The method comprises performing interlacing based on the time and/or frequency structure and/or resource structure.

There is disclosed a network node for a wireless communication network. The network node is adapted for configuring a terminal for performing interlacing, e.g. interlacing as described herein.

A method for operating a network node in a wireless communication network is described. The method comprises configuring a terminal for performing interlacing, e.g. interlacing as described herein.

In addition, a program product comprising code executable by control circuitry is proposed. The code causes the control circuitry to carry out and/or control any one or any combination of methods discussed herein.

Also, there is disclosed a carrier medium carrying and/or storing a program product as described herein.

BRIEF DESCRIPTION OF THE DRAWINGS

The drawings are provided to illustrate concepts and approaches described herein and are not intended to limit their scope, unless specifically mentioned otherwise. They comprise.

DETAILED DESCRIPTION

Herein, reference is made to LTE-related technology. However, the approaches and concepts described may be implemented in the context of other technologies and systems, e.g. 3GPP standards, e.g. to 5G technologies, and/or New Radio (NR), and/or WiFi based systems.

Interlacing for wireless communication is discussed in the following.

The upcoming standalone LTE-U forum and future 3GPP Rel-14 work item on Uplink Licensed-Assisted Access (LAA) intends to allow LTE UEs to transmit on the uplink in the unlicensed 5 GHz or license-shared 3.5 GHz radio spectrum. For the case of standalone LTE-U, the initial random access and subsequent UL transmissions take place entirely on the unlicensed spectrum. Regulatory requirements may not permit transmissions in the unlicensed spectrum without prior channel sensing. Since the unlicensed spectrum must be shared with other radios of similar or dissimilar wireless technologies, a so-called listen-before-talk (LBT) method may be needed to be applied. LBT involves sensing the medium for a pre-defined minimum amount of time and backing off if the channel is busy. Therefore, the initial random access (RA) procedure for standalone LTE-U should involve as few transmissions as possible and also have low latency, such that the number of LBT operations can be minimized and the RA procedure can then be completed as quickly as possible.

Today, the unlicensed 5 GHz spectrum is mainly used by equipment implementing the IEEE 802.11 Wireless Local Area Network (WLAN) standard, also known under its marketing brand as "Wi-Fi."

Long Term Evolution (LTE) is discussed as an exemplary RAN (Radio Access Network, a wireless communication network) herein. However, the concepts and approaches disclosed are applicable to other RANs as well, e.g. NR (New Radio).

Figure 1:
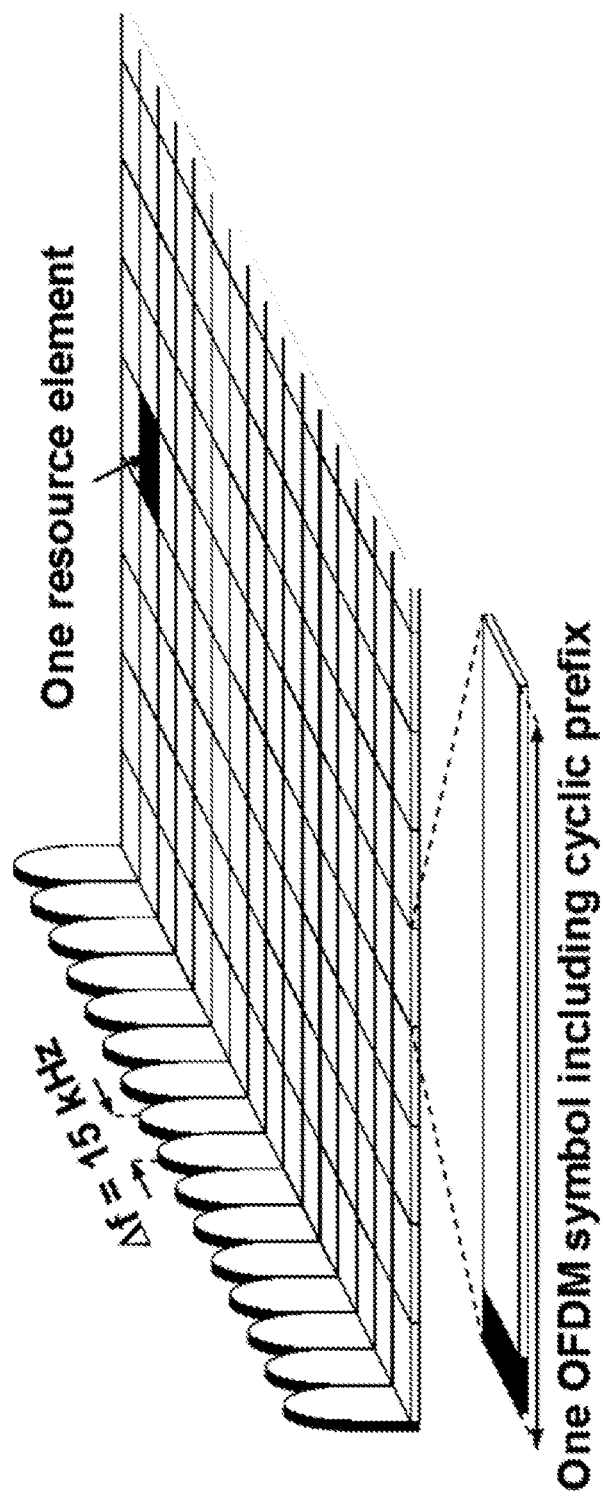
FIG. 1, showing an exemplary LTE downlink physical resource structure.

LTE uses OFDM in the downlink and DFT-spread OFDM (also referred to as single-carrier FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

FIG. 1 shows an exemplary LTE downlink physical resource structure.

Figure 2:
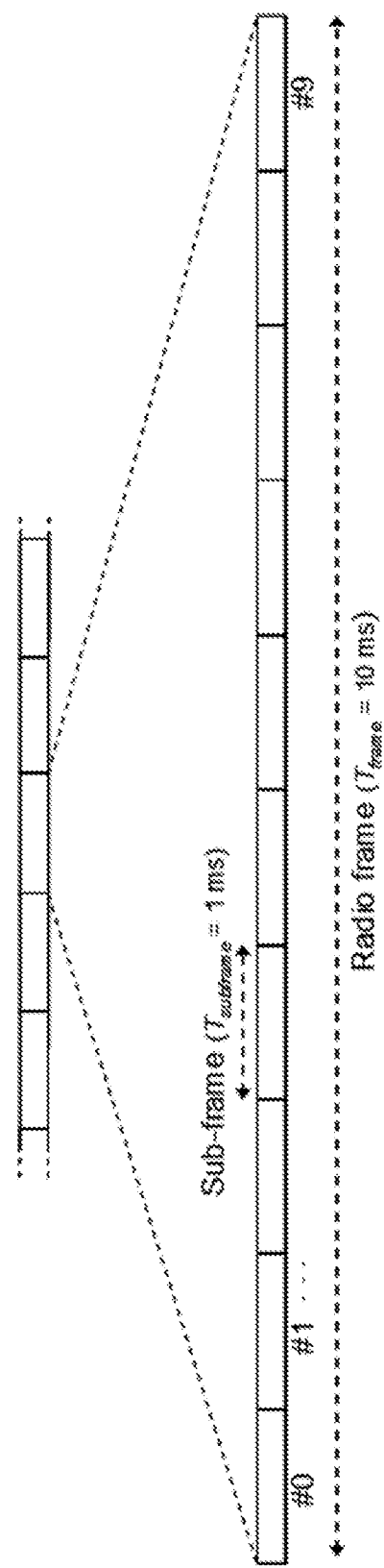
FIG. 2, showing an exemplary LTE time-domain structure.

In the time domain, LTE downlink transmissions are organized into radio frames of 10 ms, each radio frame consisting of ten equally-sized subframes of length Tsubframe=1 ms as shown in FIG. 2 FIG. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs. A time length of a symbol may be considered the smallest time unit, which generally may represent the smallest time length over which information is sent (a symbol may comprise one or more bits, depending on modulation and coding, sent over the symbol time length). A slot, subframe or frame (respectively, the related time intervals, correspond to larger time unit, comprising a plurality of symbols each, and being hierarchically defined.

FIG. 2 exemplarily shows the LTE time-domain structure.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth. A subcarrier may be considered the smallest frequency unit for transmission in LTE. A resource block, respectively the associated frequency range, may be considered a larger time unit, comprising a plurality of subcarriers (12, in LTE applications, for example).

Licensed-assisted access (LAA) to unlicensed spectrum using LTE is discussed as an example for LAA in the following.

Up to now, the spectrum used by LTE is dedicated to LTE. This has the advantage that LTE system does not need to care about coexistence issues and the spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider issues of coexistence with other systems such as IEEE 802.11 (Wi-Fi). Operating LTE in the same manner in unlicensed spectrum as in licensed spectrum can seriously degrade the performance of Wi-Fi, as Wi-Fi will not transmit once it detects that a channel is wants to transmit on is occupied (e.g., using a LBT procedure).

Figure 3:
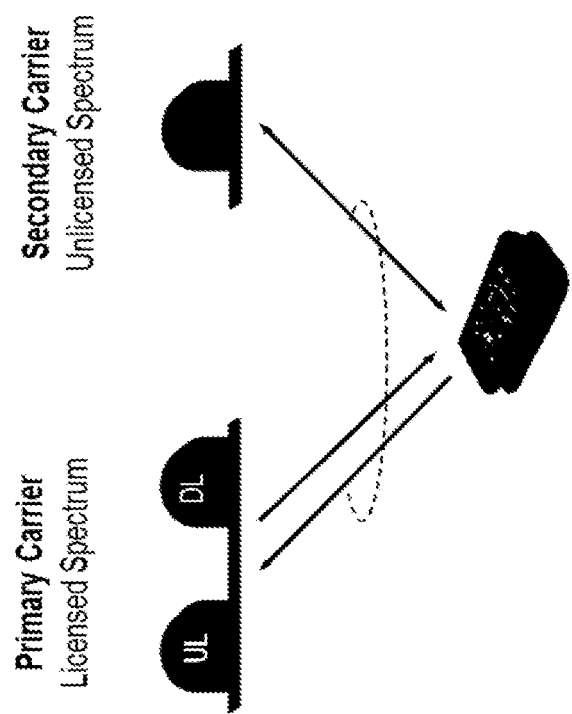
FIG. 3, showing an example for Licensed-assisted access (LAA) to unlicensed spectrum using LTE carrier aggregation.

One way to utilize the unlicensed spectrum more reliably is to transmit essential control signals and channels on a licensed carrier. That is, as shown in FIG. 3, a UE may be connected to a PCell in the licensed band and one or more SCells in the unlicensed band. In this application we denote a secondary cell in unlicensed spectrum as licensed-assisted access secondary cell (LAA SCell). A PCell and the SCells may be used in and/or be part of a carrier aggregate.

FIG. 3 shows an example for Licensed-assisted access (LAA) to unlicensed spectrum using LTE carrier aggregation.

Standalone LTE-U is discussed in the following.

A new industry forum has been initiated on extending LTE to operate entirely on unlicensed spectrum in a standalone mode, which is referred to as "MuLTEfire" in marketing terms.

In such a standalone mode, or in similar setups, there may be no licensed carrier for essential control signals transmissions and control channels. All transmission needs to be carried on the unlicensed spectrum with no guaranteed channel access availability, while also fulfilling the regulatory requirements on the unlicensed spectrum.

The use of a carrier in an unlicensed spectrum should be done in a fair and equal manner for different devices. One component when securing this fair sharing is to have requirements on how to distribute transmissions over the system bandwidth. Here, two requirements are commonly found in regulations, requirements pertaining to:

1. Occupied channel Bandwidth
2. Maximum Power Spectral Density (PSD)

For example, both these requirements are enforced for 5 GHz carriers according to ETSI, while only the maximum PSD requirements are enforced in the US regulation for 5 GHz.

An occupied bandwidth requirement may be expressed regarding a bandwidth containing 99% of the power of a signal, for example such that this bandwidth shall be between 80% and 100% of a declared Nominal Channel Bandwidth used for a signal. This requirement may be tested over a time interval longer than one sub-frame (1 ms). The frequency allocations for, and/or respective transmission power of, one UE must thus vary between sub-frames in such a way that the requirement is fulfilled. It is still an open issue if this requirement needs to be fulfilled for a UE (in particular, a UE implemented for MTC (machine-type-communication) or similar), which only transmits in a single or an isolated (e.g., between subframes of non-transmission) sub-frame, such as PRACH or with a single PUSCH.

Maximum PSD requirements exist in many different regions. For most cases, the requirement is stated with a resolution bandwidth of 1 MHz. For example, the ETSI 301 893 spec requires 10 dBm/MHz for 5150-5350 MHz. The implication of the PSD requirement on the physical layer design is that, without proper designs, a signal with small transmission bandwidth will be limited in transmission power. This can negatively affect coverage of the operation. That is, the maximum PSD requirement may be a binding condition that requires changes to UL transmissions in unlicensed spectra (in comparison with UL transmissions in licensed/LTE spectra).

Interlacing transmissions are proposed as a means to give LAA UL signals with small BW higher transmission powers when needed (while satisfying the transmission BW requirement/s). Interlacing of transmissions can be done on a PRB basis. Interlacing on a sub-carrier basis may not be good choice, since these transmissions would suffer from ICI (Inter Carrier Interference) in scenarios with large frequency offsets or with a delay spread larger than the cyclic prefix.

Figure 4:
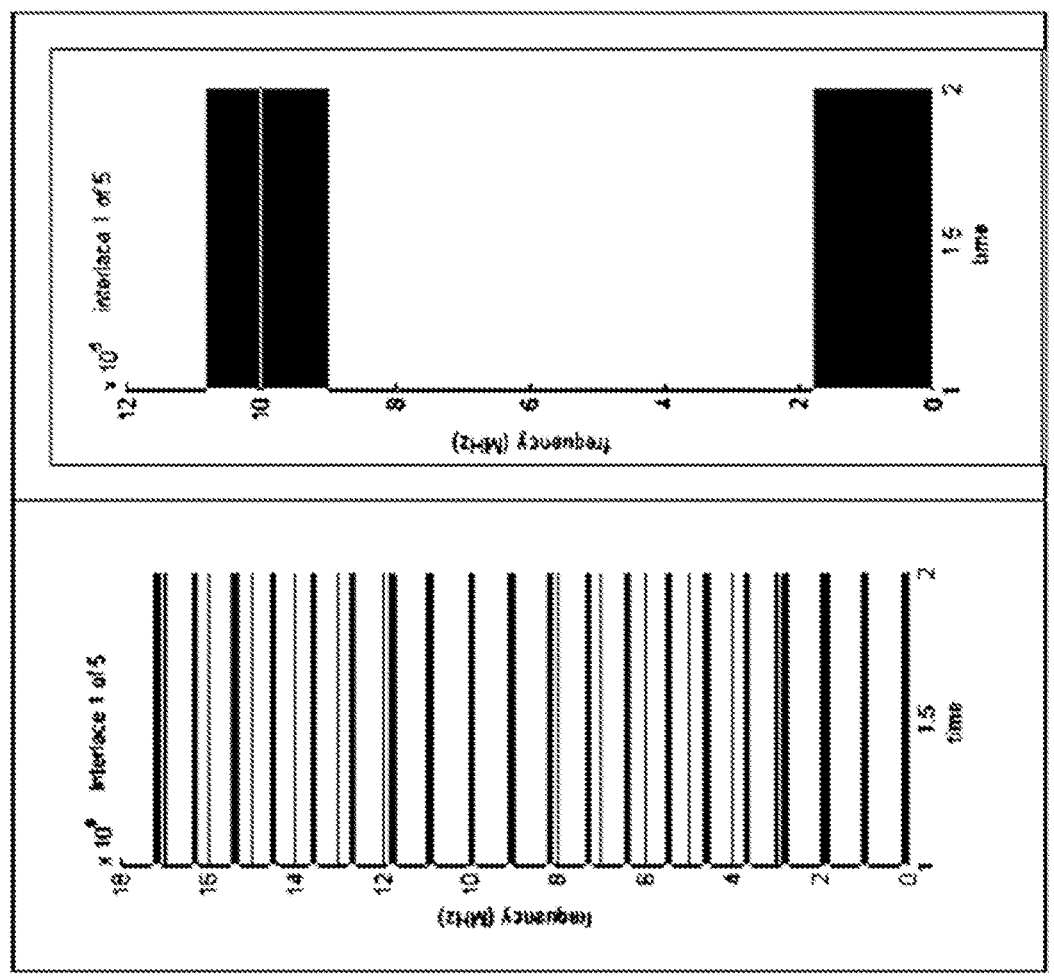
FIG. 4, showing an exemplary allocation of one first interlace.

One example for interlacing is illustrated in FIG. 4, in a design with 5 interlaces for an example of 20 MHz bandwidth. The figure to the right shows the first 1.2 MHz of the same allocation. The red lines (represented in the figures by thinner lines; these lines have a regular distance from each other corresponding to the resolution bandwidth) represent example boundaries of the PSD requirement measurement intervals (1 MHz resolution bandwidth indicated by the red/thin lines; this bandwidth corresponds to a protected interval). The green stripes (thicker stripes) represent the allocated RBs for one interlace. Looking at the picture to the right, it can be seen that using 5 interlaces leads to more than 1 RB contributing to the power within one measurement interval.

It is assumed that the measurement of the PSD requirement involves sweeping a 1 MHz window (as an example of a protected interval) across the system bandwidth and recording the highest measured power. Hence the boundaries of the measurement intervals (which may be seen as protected intervals) shown in FIG. 4 only represent one particular position of the measurement window. Nevertheless, even if the measurement interval is swept across the system bandwidth, at least one of the measurements will experience that more than one RB contributes to the power in the measurement interval as exemplified in FIG. 4.

FIG. 4 shows an allocation of one first interlace, in a design with 5 interlaces for an example of 20 MHz bandwidth. The figure to the right shows the first 1.2 MHz of the same allocation. The red lines represent example boundaries of the PSD requirement measurement intervals (1 MHz resolution bandwidth). The green stripes (thicker stripes) represent the allocated RBs for one interlace.

Requirements on maximum transmitted power per 1 MHz interval (respectively, per protected interval) will result in severe limitations of maximum transmitted power. Using interlacing several interlaces might occur into each interlace, such that each interlace must reduce transmitted power below maximum power per 1 MHz.

In the unlicensed spectrum, the transmitters (e.g., terminals or UEs and/or network node) tend to transmit with (relatively) high power most of the time in order for other nodes to hear their signal and hence prevent collisions when competing for the channel access via the LBT protocol. This means that there is little or no incentive to reduce the power, which is a quite different situation from how e.g. LTE is designed for operating in a licensed band. Thus, in order to increase the transmit power and fulfilling the existing requirements on maximum PSD, the transmit signal can be spread out over the whole bandwidth.

To achieve this with standalone LTE in the unlicensed band (S-LTE-U), RB interlacing in the uplink and/or downlink may be considered. However, with multi-carrier modulation such as OFDM, the potentially large PAPR or cubic metric CM forces a significant power back-off in the transmitter in order to preserve high signal quality with practical power amplifiers. This is due to the amount of power back-off being proportional to the signal CM. Thus, for the unlicensed band it is of interest to define a physical layer design that provides transmissions with low PAPR/CM.

This disclosure discusses, inter alia, approaches and/or a physical layer design using interlacing, which may comprise using as a modulation type for transmission, in particular uplink transmission, a (e.g.,) clustered DFT-S-OFDM preceded by a RB-to-subcarrier mapping according to a periodic, or block-wise periodic, interlaced pattern that is in particular suited for operations in the considered unlicensed band, since it reduces the CM/PAPR of the transmit signal compared to employing an OFDM-based designs with interlaces. The approaches herein may in particular be applicable for, and/or in the context of, a LTE standalone wireless communication system, which in particular may operate on unlicensed or LBT carriers, in particular only on unlicensed or LBT carriers.

The following advantages may be achieved:

A modulation type and resource mapping that brings low CM/PAPR of the transmit signal suited for operation in the considered unlicensed bands.

Potentially lower battery consumption (reduced power back-off) for a transmitter when operating in the unlicensed band compared to existing WiFi modems utilizing OFDM-based transmissions.

For a given (high) transmit power, higher signal quality (i.e., transmit EVM) with practical power amplifiers operating in unlicensed bands (e.g. at 5 GHz).

Figure 5:
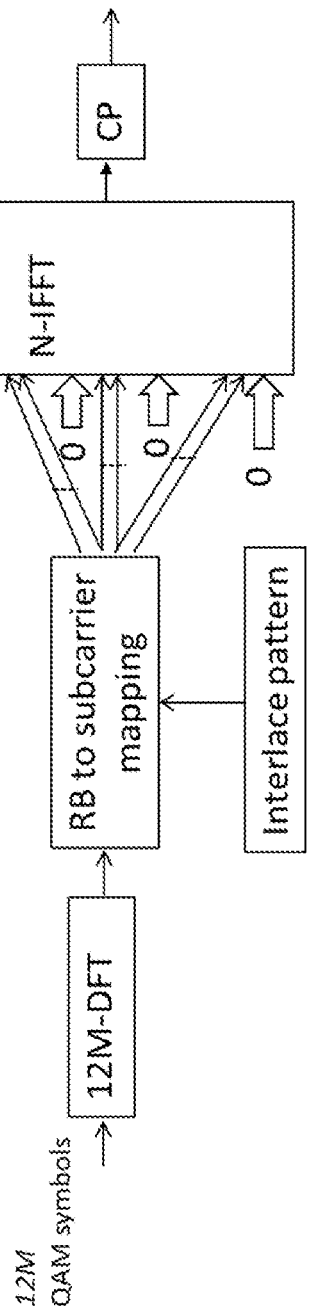
FIG. 5, showing an exemplary transmitter with clustered DFT-S-OFDM modulation.

FIG. 5 shows a block diagram of a (wireless) transmitter using interlacing with (clustered) DFT-S-OFDM modulation. That is, incoming QAM modulated samples (representing signals to be transmitted) are DFT precoded followed by a RB-to-subcarrier mapping. The RB-to-subcarrier mapping take also as input the interlacing pattern to employ, i.e., zeros are loaded on not allocated RBs. The so obtained vector of subcarriers is the input to the IFFT block that is followed by the adding of a cyclic prefix.

FIG. 5 shows a transmitter with clustered DFT-S-OFDM modulation.

To obtain low CM/PAPR with a non-localized RB pattern, the placement of RBs may be restricted in such a way that the pattern becomes approximately periodic, e.g., by utilizing uniformly spread RB interlaces. The effect of this can be appreciated by comparing the simulation results in FIG. 6 and FIG. 7, which compares three modulation types; SC-FDMA, OFDM and clustered DFT-S-OFDM. For SC-FDMA the assumed RB allocation is restricted to localized, and hence, it provides the lowest CM/PAPR of these three systems. However, SC-FDMA only serves as a reference for comparison due to its localized transmission, i.e., no interlaces. For OFDM, the placement of RBs has little or no impact, as expected. However, for clustered DFT-S-OFDM it can be observed from FIG. 6 and FIG. 7 that uniformly spread RB allocation has a large advantage in terms of low CM (or PAPR). Moreover, it can be observed that the CM levels out with uniformly spread allocation as the number of RBs within the uniform pattern increases. This is in contrast to clustered DFT-S-OFDM with arbitrary RB allocation where the CM/PAPR increases with the number of RBs.

Figure 6:
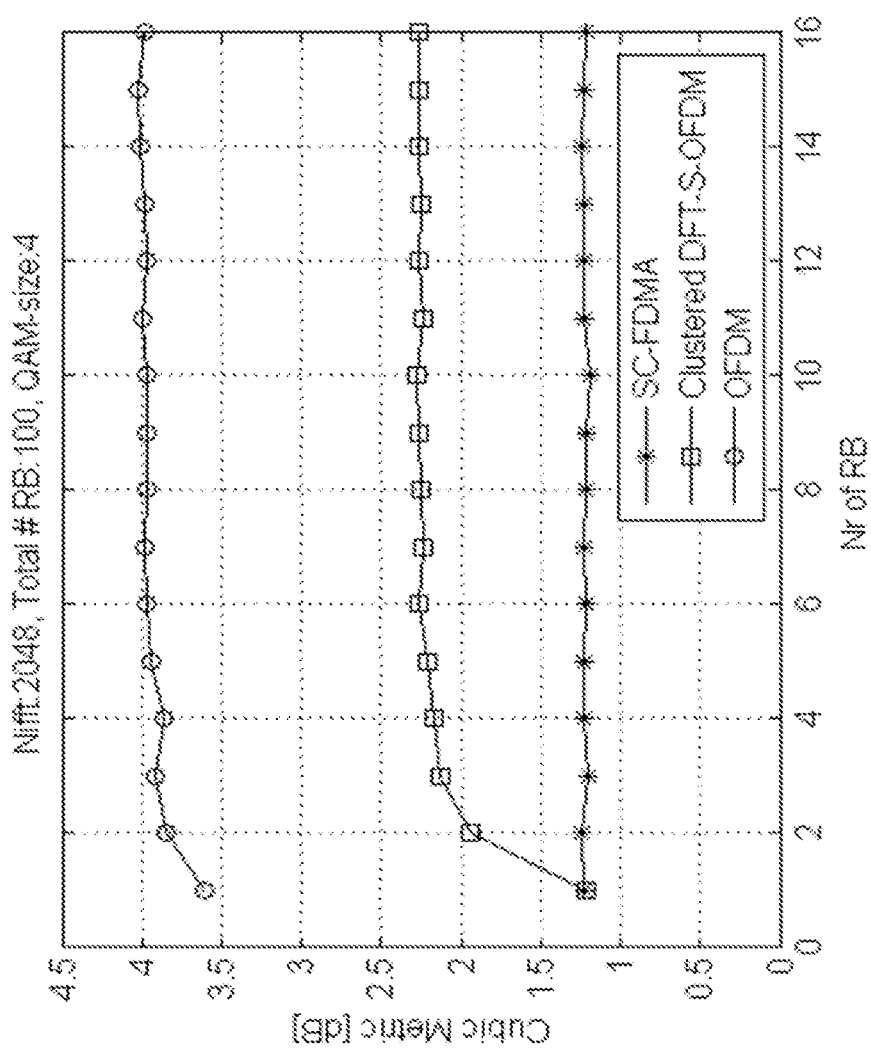
FIG. 6, showing a comparison of CM (cubic metric) for three modulation types as a function of number of allocated RBs in a 20 MHz system.

FIG. 6 shows a comparison of CM for three modulation types as a function of number of allocated RBs in 20 MHz system (in total 100 RBs available for transmission). Here, SC-FDMA has a localized RB pattern, clustered DFT-S-OFDM has a uniformly spread RB pattern over the whole bandwidth, and OFDM has uniformly spread RB pattern over the whole bandwidth.

Figure 7:
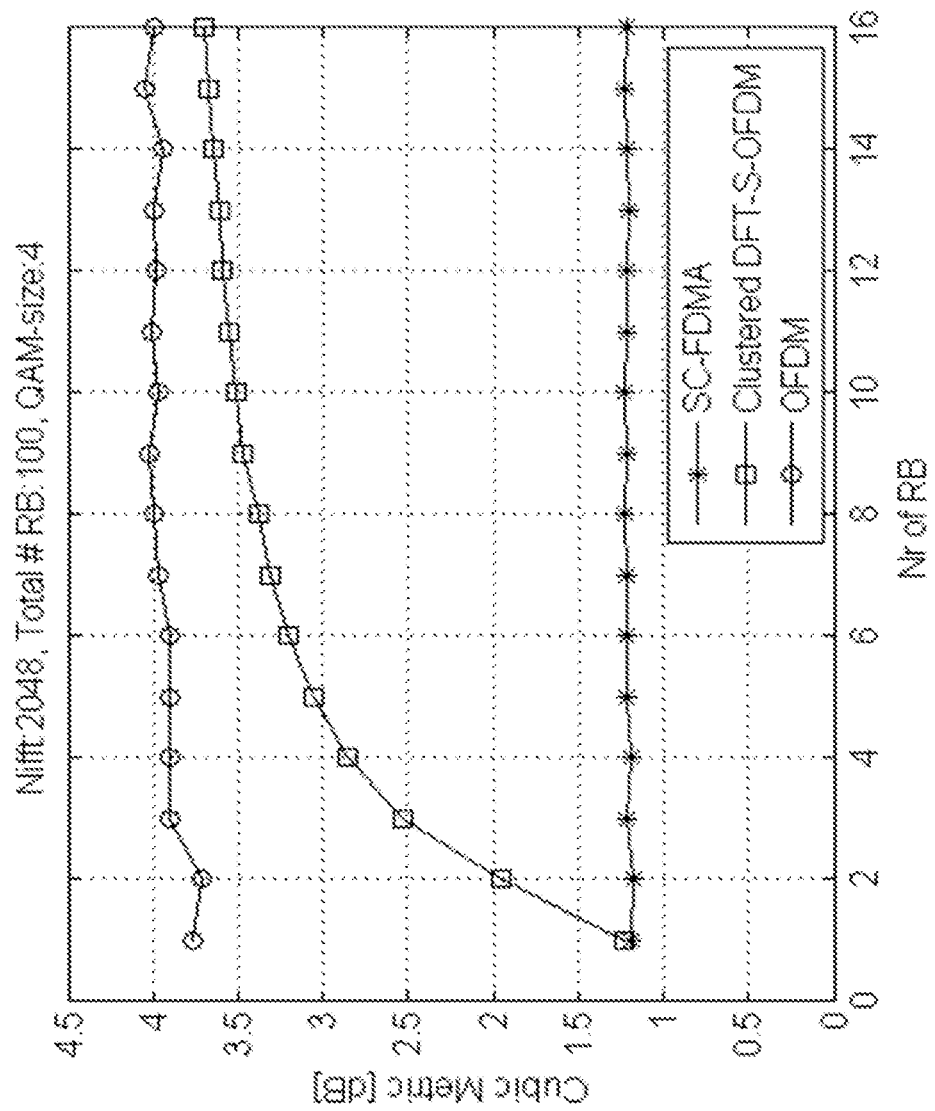
FIG. 7, showing another comparison of CM for three modulation types as a function of number of allocated RBs in a 20 MHz system.

FIG. 7 shows a comparison of CM for three modulation types as a function of number of allocated RBs in 20 MHz system (in total 100 RBs available for transmission). Here, SC-FDMA has a localized RB pattern while clustered DFT-S-OFDM and OFDM have an arbitrary RB pattern spread over the whole bandwidth.

Based on these observations it is proposed in one variant that the operation in unlicensed band, for example UL operation in S-LTE-U system, employs a set of interlace patterns that consists of uniformly (e.g. with equal distance between transmission frequencies/units) spread RBs within the considered transmission bandwidth.

It is furthermore proposed that these interlaces are employed by a transmitter equipped with clustered DFT-S-OFDM modulation rather than e.g. OFDM (as in WiFi) for low CM/PAPR transmissions.

Determining interlace patterns for achieving low PAPR/CM are discussed in the following. Interlacing may be based on one or more such patterns and/or may comprise transmitting based on one or more such patterns.

How the uplink interlaced patterns should look like and how they should be configured in the S-LTE-U system as not yet been decided in 3GPP or in the muLTEfire forums. In general, what is needed is a system that can flexibly allocate resources (i.e., RBs) to the UEs as the transmission demands change over time.

One way of doing this for the unlicensed band is to pre-define a set of interlaced RB patterns and indicate, e.g. by sending a pointer/index/indicator, these to the UEs which then allows deriving the interlace each UE shall use for transmission. Another way of doing this that allows for more flexibility is to send e.g. start RB number, periodicity, and number of RBs per interlace to indicate the interlace and/or resource allocation. The latter typically implies more configuration control overhead.

A combination of semi-static RRC configuration and dynamic signaling via downlink control information (DCI) can also be used, e.g. for interlacing.

To increase the uplink transmission capacity for a particular UE, multiple interlaced patterns (an interlace/interlaced pattern may generally refer to a set of interlaces) can be assigned to and/or configures to a UE; the patterns may be combined. If the so obtained combined pattern (or a single pattern) is periodic, or block-wise periodic, the CM/PAPR is reduced compared to a non-periodic pattern. It is hence proposed in one approach that the interlaces or set of interlaces or interlaced pattern configured for an UE (respectively their configuration and allocation) are to be as periodic, or block-wise periodic, as possible among the set of interlaces. This may be achieved e.g. if the set of interlaces consists of only uniformly spread interlaces of the same length that spans the maximum transmission bandwidth.

Figure 8:
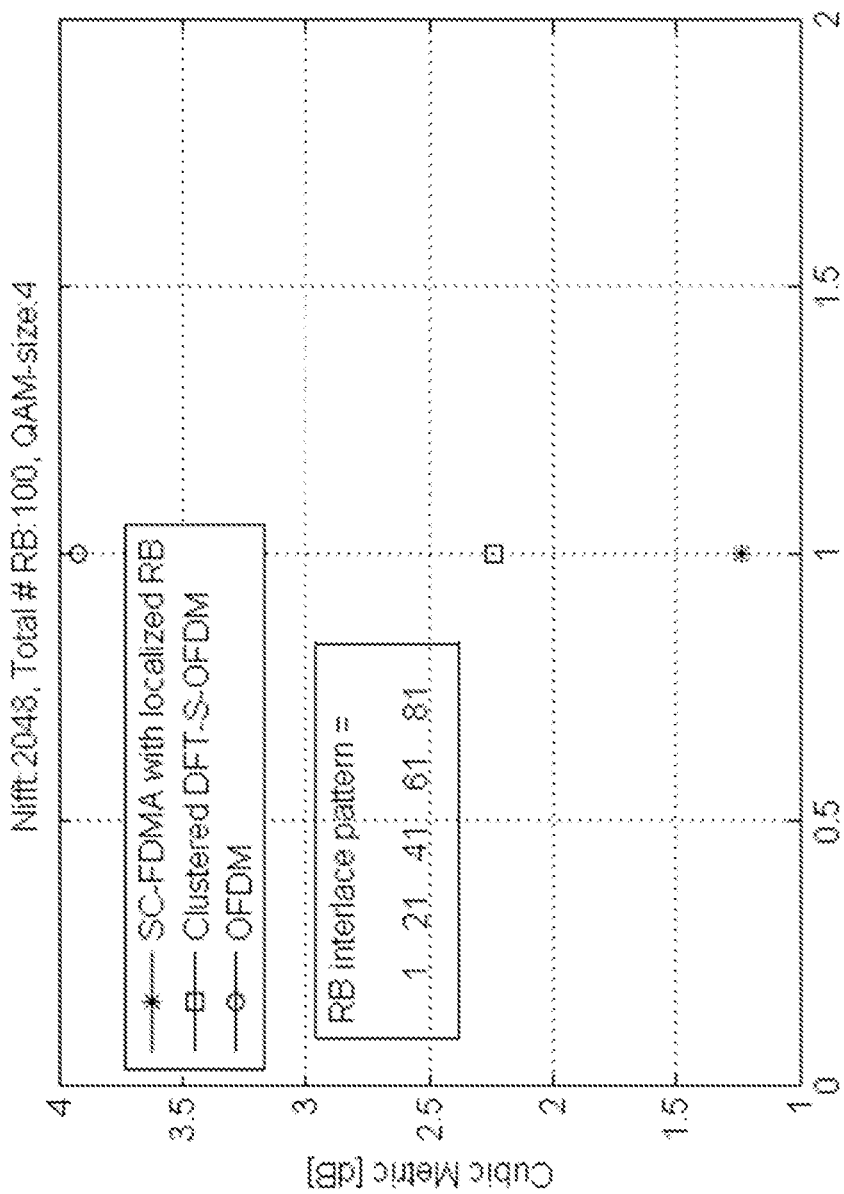
FIG. 8 showing the CM for a 20 MHz system.

To exemplify, FIG. 8 shows the CM for a 20 MHz system (1-100 RB) with the three modulation types previously described where one interlace consists of in total 5 RBs. For SC-FDMA, localized RBs are used while for OFDM and clustered DFT-S-OFDM, the RB interlace pattern is [1:20:100]. Note that the Matlab notation is used, according to which the exact RB numbers are shown in text-box in the figure. FIG. 8 shows the CM when using just one uniformly spread interlace pattern with each interlace of length-5 RBs in a 20 MHz system (RB number 1-100).

Figure 9:
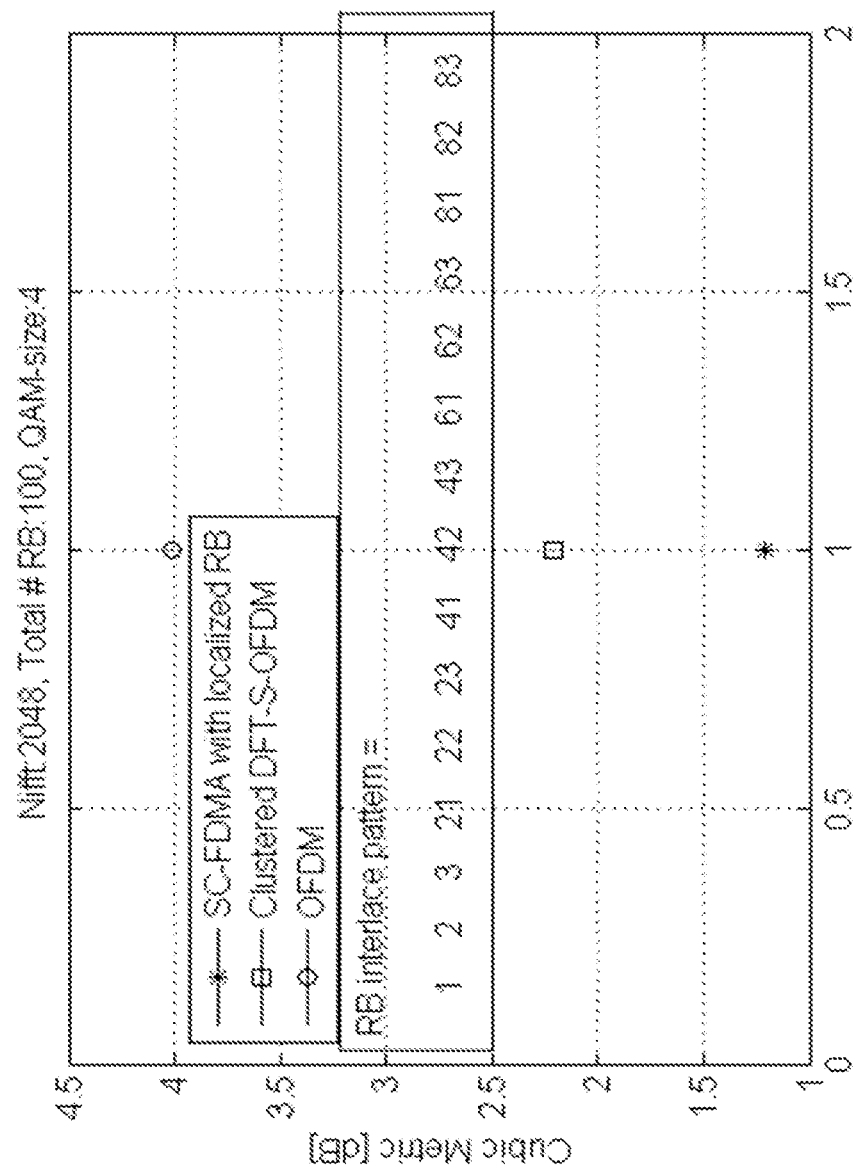
FIG. 9, showing the system of FIG. 8, with three interlaces of the same length allocated to one UE.

In FIG. 9, the same system is considered but now three interlaces of the same length are allocated to one UE, i.e., [1:20:100], [2:20:100], and [3:20:100], which are sorted in ascending order before being applied. The obtained interlace is not truly RB-periodic but block-wise periodic. As can be seen by comparing FIG. 8 and FIG. 9, this block-wise periodicity enables low CM/PAPR with multiple interlaces and actually decreases the CM slightly compared to the one interlace case. Thus, in one embodiment of this IvD, the configuration and allocation of multiple interlaces are selected such that a block-wise periodic RB pattern is obtained, or approximately so, in order to reduce CM/PAPR and hence the required power back-off. FIG. 9 shows the CM when combining three uniformly spread interlaces of length-5 RBs in a 20 MHz system (RB number 1-100). The resulting RB pattern is block-wise periodic (for each set of interlace).

For systems (or transmitter/s) that employ a set of non-uniformly spread interlaces, or uniformly spread interlaces with different lengths, an attempt to increase the uplink capacity by allocating several interlaces to an UE may create non periodic, or non block-periodic, patterns that increases the CM/PAPR and hence forces a larger power back-off to maintain a high signal quality level. In one approach, the allocation of the interlaces to an UE is based on the impact such selection has on the required power back-off. In one approach, the required back-off for combinations of interlaces is pre-calculated and stored in the system, e.g. in the transmitter, to allow searching for suitable interlace combinations wherein the CM/PAPR is taken into account. In one approach, the CM for a given interlace, or combination of interlaces, is calculated in the transmitter as part of the selection.

Scheduling for frequency-selective channels is discussed in the following.

In a wireless communication system like a S-LTE-U (Standalone LTE on Unlicensed carriers) system in which an uplink channel frequency response is measured, e.g. via sounding reference signals (SRS), different scheduling strategies can be employed for balancing the utilization of system resources, providing good enough quality of service, and fairness.

In one approach, the benefit of utilizing periodic, or block-wise periodic, RB patterns with clustered DFT-S-OFDM in an unlicensed band with interlace selection is taken into account when making the scheduling decision.

For example, an already used scheduling algorithm can be updated to take this in to account. In another example, an already used scheduler algorithm provides a RB pattern that is post-processed (i.e., adjusted) to become more periodic, or block-wise periodic. This may be sub-optimal but can have much less computational complexity. In the latter case, for example, a simple least-square fit can be applied to a set of available periodic or block-wise periodic patterns.

This disclosure describes a physical layer design, e.g. for unlicensed uplink LTE, that can operate with lower CM/PAPR than existing OFDM-based WiFi systems also for non-localized RB patterns (also referred to as interlaces).

By exploiting a modulation type known as clustered DFT-S-OFDM combined with careful selection of the allocated interlaces to an UE, more efficient transmission can be obtained. This selection may be based on simulation results and it is found that periodic, or block-wise periodic RB-patterns, are good choice for providing reduced power back-off. This impact is furthermore proposed to be used as part of a scheduling algorithm decision.

Figure 10:
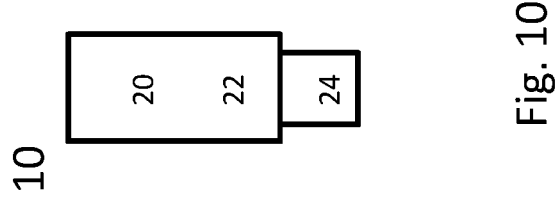
FIG. 10, schematically showing an exemplary terminal as an example for a wireless transmitter.

FIG. 10 schematically shows a terminal 10, which may be implemented in this example as a user equipment. Terminal 10 comprises control circuitry 20, which may comprise a controller connected to a memory. A receiving module and/or transmitting module and/or control or processing module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry.

Figure 11:
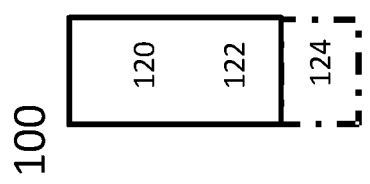
FIG. 11, schematically showing a network node or base station as an example for a wireless transmitter.

FIG. 11 schematically show a network node or base station 100, which in particular may be an eNodeB. Network node 100 comprises control circuitry 120, which may comprise a controller connected to a memory. A receiving module and/or transmitting module and/or control or processing module and/or scheduling module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry.

Figure 12:
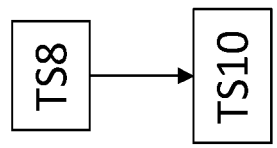
FIG. 12, schematically showing a flow diagram for an algorithm or method for operating a wireless transmitter.

FIG. 12 schematically shows a flow diagram for a method for operating a (wireless) transmitter like a terminal or network node. The method may comprise an action TS10 of performing interlacing. Action TS10 may be optionally based on an action TS8 of receiving a configuration for interlacing, e.g. from a network node. Action TS8 may in particular be performed by a transmitter implemented as terminal or UE. Action TS10, and/or actions TS8 and TS10, may be repeated as long as the transmitter is operated for transmission.

Figure 13:
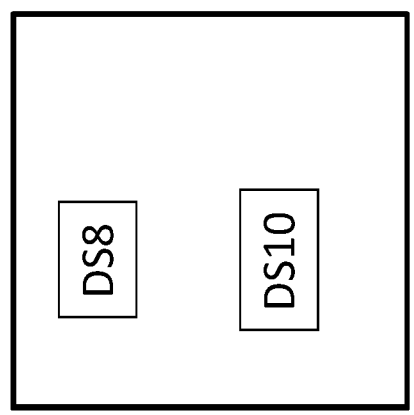
FIG. 13, schematically showing an exemplary wireless transmitter.

FIG. 13 schematically shows a (wireless) transmitter, which may be implemented as a terminal or network node. The transmitter comprises an interlacing module DS10 for performing action TS10. The transmitter may optionally, in particular if implemented as terminal, comprise a receiving module DS8 for performing action TS8.

There is generally disclosed a wireless transmitter, which may be adapted for radio and/or wireless transmission of signals. A wireless transmitter may in particular be a network node or a terminal. The wireless transmitter may be adapted for utilizing a pre-defined time/frequency structure and/or resource structure for transmission, e.g. according to LTE or UMTS or another standard. Generally, a wireless transmitter may be adapted for carrier aggregation and/or dual connectivity. It may be considered that the wireless transmitter is adapted for performing interlacing, e.g. for transmission, in particular based on the time and/or frequency structure and/or resource structure. The wireless transmitter may comprise an interlacing module for such interlacing.

There is also disclosed a method for operating a wireless transmitter. The method may comprise performing interlacing for transmission, in particular based on the time and/or frequency structure and/or resource structure.

Interlacing may be performed based on scheduled resources and/or a resource allocation. The scheduled resources or the resource allocation may be configured by a (second) wireless transmitter, e.g. by a network node, in particular if the (first) wireless transmitter is a terminal. The wireless transmitter may be adapted to receive, and/or comprise a receiving module to receive, and/or may receive, a corresponding configuration and/or corresponding configuration or allocation data.

A time and/or frequency structure may define time and/or frequency resources or units, e.g. to be used for transmission. The structure may define time units (intervals), which may have several hierarchical levels. In particular, the structure may define a smallest time unit for transmission (e.g., symbol time or a metric time unit or a number of chips) and/or, in particular a frequency structure, a smallest frequency/bandwidth unit (in particular, in terms of width rather than specific frequency range) in particular for transmission, (e.g. subcarrier/subcarrier width or minimum bandwidth). The structure may define larger (hierarchically higher level) units or superstructures, which may comprise a plurality of the smallest units, e.g. carriers with subcarriers or larger time units like a slot time interval or subframe time lengths. There may be multiple levels/multiple superstructures defined.

A resource structure may be a time/frequency structure defining resource combinations, which may comprise time units and associated frequency units. A resource block is an example for a resource structure, having a time interval of 1 slot time unit (covering a number of symbols, e.g. 7) and a number of subcarriers, e.g. 12 subcarriers. A resource structure may be considered to cover a frequency range, e.g. multiple smallest frequency units (e.g., a resource block may cover a number of subcarriers, e.g. 12 for LTE applications). This range may be seen as frequency unit, which may be larger than the smallest frequency unit.

There may be defined a protected interval or resource, e.g. according to regulations. A protected interval may define an interval (for example, a bandwidth, which may refer to a width in frequency rather than a specific frequency range) in frequency, which may be an interval for which a pre-defined protection requirement or condition may hold and/or be measured and/or be defined. A protected resource may define a protected interval and a protection time interval for which the protection requirement or condition is to be considered (the requirement or condition may pertain to an average or weighted average or sum over several, possibly continuous and/or contiguous, protected intervals, and/or over several, possibly continuous and/or contiguous, protection time intervals fulfilling the requirement or condition). A protection requirement or condition may in particular pertain to the maximum power transmittable (allow to be transmitted) and/or a maximum PSD allowed for transmission in the protected interval and/or the protected resource, and/or pertain to an occupancy condition (occupied channel condition) as mentioned herein.

Interlacing may generally comprise transmitting on resources such that the transmitting device transmits on frequencies or frequency resources that are separated by one or more frequency units (e.g., smallest frequency unit, or in particular a frequency range covered by a resource block). The separating units may be frequency units on which the wireless transmitter does not transmit (with the exception of undesired leakage or interference, which may appear due to physical reasons). Generally, interlacing may in particular pertain to interlaces defined in regard to resource blocks (respectively, the corresponding frequency range covered by a RB). Interlacing may comprise transmitting one or more interlaces and/or on one or more interlaces. Generally, interlacing may comprise mapping and/or scheduling one or more interlaces on resources, which may be scheduled resources. Scheduled resources may be scheduled and/or configured by the wireless transmitter, for example for downlink or uplink transmission. Scheduled resources may pertain to one or more resource units, in particular resource blocks and/or cover a plurality of frequency units, e.g. a carrier (which comprises a plurality of subcarriers). For uplink transmission, scheduled resources may be configured by another wireless transmitter, e.g. a network node. Mapping may generally be performed by a wireless transmitter itself, e.g. based on scheduled resources (e.g., a network node or terminal may perform the mapping itself, e.g. via a mapping module). Alternatively, the mapping may be performed by a configuring transmitter, e.g. a network node (in this case, the mapping may be indicated via allocation and/or configuration data, and/or interlacing may comprise transmitting according to scheduled resources and/or based on the indicated mapping).

An interlace may be defined regarding a frequency structure and/or associated resource structure such that an interlace comprises and/or covers a plurality of frequency units (and/or associated resource units), e.g., a number of Nu units, one of which is and/or may be used for transmission, wherein one or more others (e.g., Nu−1) are not used for transmission. The units in particular may be resource blocks. Nu may generally be 6 or a multitude of 6.

The frequency units of an interlace may be continuous and/or contiguous in frequency. It may be considered that an interlace is generally defined pertaining to widths in frequency, rather than a specific frequency range (notwithstanding the possibility that different interlace may be defined for different frequency ranges, e.g. due to different protected intervals defined by regulations, and/or that a specific interlace would be defined and/or map the interlace structure to a specific frequency range). In particular, an interlace may cover a continuous or contiguous frequency range, which may be referred to as interlace range.

The frequency unit of an interlace used for transmission may be referred to as transmission unit, the other units may be referred to as non-transmission unit. A unit of an interlace may in particular be a resource block, respectively a frequency unit may correspond to the associated frequency range of a resource block. Generally, interlacing may comprise transmitting one or more interlaces (e.g., continuous and/or contiguous interlaces), which may thus include transmitting on a number of transmission units corresponding to the number of interlaces.

It may be considered that for interlacing, the transmission unit is at one of the borders of the frequency range covered by the interlace, e.g. at the highest or lowest frequencies of the interlace. The same arrangement of transmission unit in the interlace may be used for different interlaces (covering different frequency ranges) for performing interlacing. It may be considered that transmission units of interlaces are arranged such that each protected interval (e.g., of a system bandwidth) includes at most one transmission unit (transmission resource block).

Nu may generally be defined and/or chosen and/or configured and/or be such that one interlace covers a (or at least one) protected interval respectively its width, in particular such that Nu is the smallest (integer) number such that the frequency range covered by that one interlace covers a protected interval. Generally, there may hold $Nu$=(frequency range or width of the protected interval/frequency range covered by a frequency unit of the interlace) or $Nu$=protected interval/frequency range covered by a resource block.

Nu generally may be determined as integer, and rounded off or up to the next integer or to the next larger integer. It should be noted that this may be a lower boundary for Nu, and that Nu may be chosen to be larger.

It may be considered that Nu differs between interlaces. For example, it may be considered to arrange a first set of interlaces (number N1 of 1 or more interlaces) with $Nu1=N$, and a second set of interlaces (number N2 of 1 or more interlaces) with $Nu2=N+1$. The interlaces of the first and second set may be arranged in a set of interlaces, which may be continuous or contiguous regarding the interlaces contained therein. Nu1 and Nu2, as well as the arrangement of interlaces in the set may be arranged such that in no protected interval there is more than one transmission unit (unit, in particular resource block, in which transmission is scheduled/intended/occurs), and/or to cover a system bandwidth. This may generally hold, e.g. also for $Nu2=0$ or $Nu1=0$. Nu1, 2 may be seen as examples or implementations of Nu. More than two sets of interlaces may be utilised (with Nu3, . . . , Nun analogously to the above).

An interlace or set of interlaces, respectively corresponding resources, may be considered to represent a cluster of resources, due to transmission units (a frequency or resource unit used or scheduled for transmission) and/or resources used or scheduled for transmission being clustered between transmission units and/or resources not used or scheduled for transmission. In this context, arranging a single transmission unit or resource, or more than one transmission unit or resource, between (regarding neighboring frequencies or frequency units like subcarriers) frequency or resource units not scheduled for transmission may be seen as clustering. Generally, clustering may pertain to, at least partly over a frequency range, in particular the range covered by one or more resource blocks, arranging transmission units (in particular, subcarriers) non-contiguous to other transmission units (at least on one side).

Scheduled resources and/or a resource allocation may indicate and/or comprise an interlace pattern. The resources or allocation may be transmission resources, in particular uplink transmission resources, and/or may be associated or allocated to a specific device, e.g. a wireless transmitter like a terminal (which may have been allocated the resources by a network node like an eNodeB, or a network node, which may have allocated the resources to itself). An interlace pattern may comprise one or more sets of interlaces. One or more, in particular each, set/s, and/or the pattern, may be periodic and/or quasi-periodic, in particular in terms of location and/or arrangement of transmission units (in particular, subcarriers) or resources in frequency. It may be considered that the set/s and/or pattern is block-wise periodic or quasi-periodic. Block-wise (quasi-) periodicity may refer to a specific pattern of transmission units (in particular, subcarriers) being repeated (in frequency space) over a frequency range for a plurality of times (twice or more, in particular 5 times or more). The (quasi-)periodicity may be considered block-wise, if the repeated pattern covers only a part of the interlace pattern of the scheduled resources or resource allocation. An interlace pattern may comprise a plurality of repeating patterns, in particular of block-wise repeating patterns. The individual repeating patterns may be different. The repeating pattern/s may be associated and/or be dependent on interlaces and/or sets of interlaces the interlace pattern comprises. The interlace pattern may generally be defined and/or configured based on interlace indications or interlace set indications (which may be represented by configuration data or allocation data). A repeated pattern may be considered quasi-periodic if one or more transmission units (in particular, subcarriers) are slightly shifted away from periodicity in the frequency space. A slight shift may be a shift of one or two width of a transmission unit widths (in particular, subcarrier widths) up or down, and/or a shift for a distance (in frequency space) lower than 10% or lower than 5% of the total frequency range covered by the repeated pattern. A periodic or quasi-periodic repeated pattern may have transmission units or clusters of neighboring or contiguously arranged transmission units (in particular, subcarriers or blocks or clusters of subcarriers) equidistantly arranged (in regard to frequency space). The distance in frequency space may for example be in frequency or frequency units, in particular in subcarriers (and/or smallest frequency units).

Interlacing may generally comprise performing a DFT-OFDM modulation for signals to be transmitted, in particular based on scheduled resources or a resource allocation, which may comprise or indicate an interlace pattern. Performing modulation may comprise and/or be based on a RB-to-subcarrier mapping, e.g. of QAM-modulated signals. DFT-OFDM modulated signals on scheduled resources or a resource allocation. The modulation may be a clustered modulation and/or a DFT-S-OFDM (DFT-spread-OFDM) modulation. The modulation may be performed as described herein. A wireless transmitter may be adapted for performing such modulation and/or comprise a modulation module for such modulation. A DFT-OFDM modulation may be considered clustered, as and/or when it is performed on clustered resources, e.g. an interlace pattern as described herein.

An interlace pattern may generally comprise and/or indicate one or more sets of interlaces. The pattern may indicate or comprise frequency units (e.g., subcarriers) and/or resources available and/or scheduled for transmission, e.g. resource blocks and/or one or more transmission units, e.g. subcarriers. The pattern may be indicated by configuration data and/or allocation data.

A wireless transmitter, in particular a network node, may configure, and/or be adapted for configuring and/or comprise a configuring module for configuring, one or more wireless transmitters, e.g. terminals, for performing interlacing, and/or for utilizing a set of interlaces for transmitting, e.g. by allocating or configuring the resources corresponding to a set of interlaces to a terminal, for example by transmitting corresponding configuration or allocation data.

Performing interlacing and/or transmitting based on a frequency structure and/or resource structure may refer to following and/or utilizing the structure when transmitting.

Interlacing, and/or transmitting in particular in the context of interlacing, may comprise performing an LBT procedure, and/or may be dependent on a successful LBT procedure, e.g. for the transmission unit and/or the interlace including the transmission unit. Interlacing, and/or transmitting in particular in the context of interlacing, may comprise transmitting such that in the/each transmitting unit/transmitting resource block of an interlace the maximum allowable power or PSD and/or a power up to the maximum allowable power or PSD for a protected interval is used for transmission. It may be considered that interlacing or transmitting comprises transmitting such that in average over a pre-determined number of time units (e.g., slots and/or sub-frames and/or time units associated to a resource structure or resource unit) in the transmitting unit/transmitting resource block of an interlace the maximum allowable power or PSD and/or a power up to the maximum allowable power or PSD for a protected interval is used for transmission. This maximum power/PSD may be defined as requirement or condition for the protected interval in which the transmitting unit is arranged and/or covered by the interlace.

There may be considered a wireless transmitter and/or network node adapted for performing any one of the methods for operating a wireless transmitter and/or network node described herein.

There may be considered a terminal adapted for performing any one of the methods for operating a terminal described herein.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Alternatively or additionally, there may be considered a wireless transmitter, in particular a network node. The wireless transmitter may be adapted for, and/or comprise a configuring module for, configuring a terminal for performing interlacing. Configuring may in particular comprise configuring the terminal with scheduled resources and/or a resource allocation as described herein, and/or indicating an interlace pattern. The wireless transmitter may be adapted for determining, and/or comprise a determining module for determining scheduled resources and/or a resource allocation and/or an interlace pattern, e.g. based on operational conditions. Determining may comprise selecting an interlace pattern (and/or scheduled resources and/or a resource allocation), e.g. from a number of pre-determined (e.g., based on calculations and/or simulation) or pre-defined (e.g., based on a standard) interlace patterns. Determining may be based on operational conditions, e.g. traffic and/or channel state information regarding the communication to one or more terminals and/or information of other devices accessing or wanting to access the resources (e.g., WIFI-devices) and/or terminal resource request information. A determining module may be a scheduler.

Alternatively or additionally, a method for operating a wireless transmitter may be considered, in particular for operating a network node. The method may comprise configuring a terminal for performing interlacing. Configuring may in particular comprise configuring the terminal with scheduled resources and/or a resource allocation as described herein, and/or indicating an interlace pattern. The method may comprise determining scheduled resources and/or a resource allocation and/or an interlace pattern, e.g. based on operational conditions. Determining may comprise selecting an interlace pattern (and/or scheduled resources and/or a resource allocation), e.g. from a number of pre-determined (e.g., based on calculations and/or simulation) or pre-defined (e.g., based on a standard) Interlace patterns. Determining may be based on operational conditions, e.g. traffic and/or channel state information regarding the communication to one or more terminals and/or information of other devices accessing or wanting to access the resources (e.g., WIFI-devices) and/or terminal resource request information. A determining module may be a scheduler.

A wireless transmitter may in particular be a transmitter for and/or in a wireless communication system, in particular for a LTE-U system utilizing unlicensed carriers.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header.

Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. It may be generally considered that control circuitry is referred to, and/or comprises and/or is implemented as, processing circuitry. Collectively, the controller and any associated memory may be referred to as a processing circuit. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A wireless transmitter may be a node of a wireless communication network and/or may be implemented as a terminal and/or user equipment and/or network node and/or base station and/or relay node and/or any device generally adapted for communication in a wireless communication network, in particular cellular communication, e.g. in or for a cellular network.

A wireless network or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. The controller and/or control circuitry, together with any associated memory, may be referred to as a processing circuit. It may be considered that a terminal or user equipment is configured to be a terminal or user equipment adapted for LTE/E-UTRAN.

A base station may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication, the latter of which may be referred to as processing circuitry. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. The controller and/or control circuitry, e.g. together with any associated memory, may be referred to as a processing circuit or circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

It may be considered that for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands. A network node, e.g. a base station or eNodeB, may be adapted to provide and/or define and/or control one or more cells, e.g. a PCell and/or a LA cell.

A network node, in particular a base station, and/or a terminal, in particular a UE, may be adapted for communication in spectral bands (frequency bands) licensed and/or defined for LTE. In addition, a network node, in particular a base station, and/or a terminal, in particular a UE, may be adapted for communication in freely available and/or unlicensed/LTE-unlicensed spectral bands (frequency bands), e.g. around 5 GHz.

An LBT carrier may refer to a carrier or cell on which an LBT procedure is to be performed before transmitting, in particular in an unlicensed spectrum or frequency band. The expression LBT carrier may be used interchangeably with LA SCell or unlicensed cell or unlicensed carrier. A carrier may be associated to a spectrum and/or frequency band and/or a channel. A cell may have associated to it at least one channel or carrier; it may be considered that a cell comprises different carriers or channels for uplink or downlink. A cell may comprise one or more than one frequency bands (e.g. subcarriers) and/or channels for each data transmission direction (uplink and downlink). There may be different number of channels or frequency bands for uplink and downlink.

A LBT procedure may generally refer to a procedure determining whether a transmission is possible or admissible (in particular, for the node or terminal performing the LBT) to transmit in a given spectrum or frequency band or cell or carrier, in particular, on a LA Scell or LBT carrier, and/or whether another transmission is taking place, which would indicate that no own transmission is possible.

A LBT procedure may comprise listening to a channel and/or spectrum and/or frequency band and/or carrier, on which it may be performed which may be intended for a transmission), in particular listening for transmission from another source and/or transmitter, which may comprise receiving and/or detecting the energy or power of transmissions or radiation in this channel and/or spectrum and/or frequency band. Failure of a LBT procedure may indicate that transmissions on the channel or cell or frequency band have been detected, so that it may be considered blocked by or for another transmitter, e.g. due to detection of a predetermined energy or power level. Failure of a LBT procedure may be considered to be equivalent to a determination of a channel/spectrum/band/carrier to be Busy.

A successful LBT procedure may indicate the channel/spectrum/band/carrier to be Idle. Generally, a LBT procedure may be performed before transmission and/or before a scheduled transmission. It may be considered that a LBT procedure is performed frame- and/or subframe-based and/or in synchronization to the timing structure of a cell, in particular a PCell. A LBT procedure may comprise one or more CCA procedures.

Listening and/or performing a CCA may comprise determining and/or measuring the power and/or energy on the channel/spectrum/band/carrier listened to (and/or on which CCA is performed) over predetermined time. The measured power or energy may be compared to a threshold to determine Busy or Idle states.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device.

Allocation data may be considered to be data scheduling and/or indicating and/or granting resources allocated by the controlling or allocation node, in particular data identifying or indicating which resources are reserved or allocated for communication for a wireless device or terminal and/or which resources a wireless device or terminal may use for communication and/or data indicating a resource grant or release, in particular pertaining to uplink and/or downlink resources. A grant or resource or scheduling grant or scheduling data (which, in particular, may pertain to information regarding and/or representing and/or indicating scheduling of resources) may be considered to be one example of allocation data. Allocation data may in particular comprise information and/or instruction regarding a configuration and/or for configuring a terminal, e.g. indicating a measurement configuration to be used. It may be considered that an allocation node or network node is adapted to transmit allocation data directly to a node or wireless device and/or indirectly, e.g. via a relay node and/or another node or base station.

Allocation data may comprise control data and/or be part of or form a message, in particular according to a pre-defined format, for example a DCI format, which may be defined in a standard, e.g. LTE. Allocation data may comprise configuration data, which may comprise instruction to configure and/or set a user equipment for a specific operation mode, in particular a measurement mode, e.g. in regard to the use of receiver and/or transmitter and/or transceiver and/or use of transmission (e.g. TM) and/or reception mode, and/or may comprise scheduling data, e.g. granting resources and/or indicating resources to be used for transmission and/or reception. A scheduling assignment may be considered to represent scheduling data and/or be seen as an example of allocation data. A scheduling assignment may in particular refer to and/or indicate resources to be used for communication or operation. Configuration or allocation data may comprise an indication for configuring a terminal for interlacing, in particular resources available, for which interlacing may be performed, e.g. a set of interlaces and/or how to interlace and/or a mapping for interlacing and/or a frequency range on which to perform interlacing, wherein the frequency range may correspond to the frequency range covered by a set of interlaces.

Configuring a terminal or wireless device or node may comprise instructing and/or causing the terminal or wireless device or node to change its configuration, e.g. at least one setting and/or register entry and/or operational mode. A terminal or wireless device or node may be adapted to configure itself, e.g. according to information or data in a memory of the terminal or wireless device. Configuring a node or terminal or wireless device by another device or node or a network may refer to and/or comprise transmitting information and/or data and/or instructions to the wireless device or node by the other device or node or the network, e.g. allocation data or configuration data and/or scheduling data and/or scheduling grants. Configuring a terminal may include sending allocation data to the terminal indication which modulation and/or encoding to use. A terminal may be configured with and/or for scheduling data and/or to use, e.g. for transmission, scheduled and/or allocated uplink resources, and/or, e.g. for reception, scheduled and/or allocated downlink resources. Uplink resources and/or downlink resources may be scheduled and/or provided with allocation or configuration data.

A first cell may generally be a cell of a licensed cellular network, e.g. LTE. It may be a PCell and/or a cell intended to carry control and command information, in particular for the PCell and/or the second cell, for example a LA SCell.

A second cell and/or second uplink carrier, respectively second downlink carrier, generally may be a cell and/or uplink carrier, respectively downlink carrier, of a non-licensed network and/or a cell and/or uplink carrier, respectively downlink carrier, on which a LBT procedure has to be performed/has been performed before transmission of data, in particular a LA SCell. Control information/scheduling for the second cell may be transmitted on the first cell, e.g. to provide licensed-assisted controlling and scheduling.

An uplink carrier may generally be or indicate a carrier and/or frequency band intended and/or used for uplink transmissions.

A downlink carrier may generally be or indicate a carrier and/or frequency band intended and/or used for downlink transmissions.

A carrier may generally be an unlicensed carrier and/or be accessed for transmission based on and/or after a successful LBT procedure. A channel may generally be a physical channel and/or defined by comprising and/or being associated to one or more (radio and/or time/frequency) resources, in particular resource elements or resource blocks.

Some useful abbreviations comprise:

| Abbreviation | Explanation |
| --- | --- |
| 3GPP | $3^{rd}$ Generation Partnership Project |
| Ack/Nack | Acknowledgment/Non-Acknowledgement, also A/N |
| AP | Access point |
| B1, B2, . . . Bn | Bandwidth of signals, in particular carrier bandwidth Bn assigned to corresponding carrier or frequency f1, f2, . . . , fn |
| BER/BLER | Bit Error Rate, BLock Error Rate; |
| BS | Base Station |
| CA | Carrier Aggregation |
| CIS | Transmission Confirmation Signal |
| CoMP | Coordinated Multiple Point Transmission and Reception |
| CQI | Channel Quality Information |
| CRS | Cell-specific Reference Signal |
| CSI | Channel State Information |
| CSI-RS | CIS reference signal |
| CCA | Clear Channel Assessment |
| CM | Cubic Metric |
| CRS | Cell-Specific Reference Signal |
| D2D | Device-to-device |
| | Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE) |
| DRS | Discovery Reference Signal |
| DCI | Downlink Control Information |
| DMRS | Demodulation Reference Signals |
| DFT | Discrete Fourier Transform |
| eNB | evolved NodeB; a form of base station, also called eNodeB |
| EPDCCH | Enhanced Physical DL Control CHannel |
| | Evolved UMTS Terrestrial Radio Access/Network, an example of a RAT carriers/carrier frequencies; different numbers may indicate that the referenced carriers/frequencies are different |
| f1_UL, . . . , fn_UL | Carrier for Uplink/in Uplink frequency or band |
| f1_DL, . . . , fn_DL | Carrier for Downlink/in Downlink frequency or band |
| FDD | Frequency Division Duplexing |
| ID | Identity |
| L1 | Layer 1 |
| L2 | Layer 2 |
| LA | Licensed Assisted |
| LAA | Licensed Assisted Access |
| LBT | Listen-before-talk |
| LTE | Long Term Evolution, a telecommunications standard |
| LTE-U | LTE in Unlicensed Spectrum |
| MAC | Medium Access Control |
| MBSFN | Multiple Broadcast Single Frequency Network |
| MDT | Minimisation of Drive Test |
| NW | Network |
| OFDM | Orthogonal Frequency Division Multiplexing |
| O&M | Operational and Maintenance |
| OSS | Operational Support Systems |
| PAPR | Peak-to-Average Power Ratio |
| PC | Power Control |
| PDCCH | Physical DL Control CHannel |
| PH | Power Headroom |
| PHR | Power Headroom Report |
| PSS | Primary Synchronization Signal |
| PUSCH | Physical Uplink Shared Channel |
| PCFICH | Physical Control Format Indicator Channel |
| PUCCH | Physical Uplink Control Channel |
| R1, R2, . . . , Rn | Resources, in particular time-frequency resources, in particular corresponding carrier f1, f2, . . . , fn |
| RA | Random Access |
| RACH | Random Access CHannel |
| RAT | Radio Access Technology |
| RE | Resource Element |
| RB | Resource Block |
| RRH | Remote radio head |
| RRM | Radio Resource Management |
| RRU | Remote radio unit |
| RS | Reference Signal |
| RSRQ | Reference signal received quality |
| RSRP | Reference signal received power |
| RSSI | Received signal strength indicator |
| RX | reception/receiver, reception-related |
| SA | Scheduling Assignment |
| SINR/SNR | Signal-to-Noise-and-Interference Ratio; Signal-to-Noise Ratio |
| SFN | Single Frequency Network |
| SON | Self Organizing Network |

| Abbreviation | Explanation |
|---|---|
| SSS | Secondary Synchronization Signal |
| SCell | Secondary Cell |
| SRS | Sounding Reference Signal |
| S-LTE-U | Standalone LTE in Unlicensed Spectrum |
| TPC | Transmit Power Control |
| TX | transmission/transmitter, transmission-related |
| TDD | Time Division Duplexing |
| TTI | Transmission-Time Interval |
| UCI | Uplink Control Information |
| UE | User Equipment |
| Uplink; generally referring to transmission of data to a node/into a direction closer to a network core (physically and/or logically); in particular from a D2D-enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency | |

These and other abbreviations may be used according to LTE standard definitions.

The invention claimed is:

1. A terminal for a wireless communication network, the terminal comprising control circuitry configured to:
perform interlacing by performing clustered Discrete Fourier Transform (DFT) spread Orthogonal Frequency Division Multiplexing (OFDM) (DFT-S-OFDM) modulation for an uplink signal to be transmitted in an unlicensed frequency band;
receive quadrature amplitude modulation (QAM) modulated samples representing the uplink signal to be transmitted;
perform DFT precoding of the received QAM modulated samples;
receive an interlace pattern;
perform a resource block (RB) to subcarrier mapping of the DFT precoded samples using the received interlace pattern to obtain a vector of subcarriers; and
input the obtained vector of subcarriers to perform an inverse Fast Fourier Transformation (IFFT) for low cubic metric (CM)/peak to average power ratio (PAPR) transmissions.

2. The terminal of claim 1, wherein the control circuitry is configured to perform the interlacing, based on resources that are clustered according to a periodic, or block-wise periodic, interlacing pattern.

3. The terminal of claim 2, wherein the interlacing pattern comprises uniformly spread resource block (RB) interlaces.

4. A method for operating a terminal in a wireless communication network, the method comprising:
performing interlacing by performing clustered Discrete Fourier Transform (DFT) spread Orthogonal Frequency Division Multiplexing (OFDM) (DFT-S-OFDM) modulation for an uplink signal to be transmitted in an unlicensed frequency band;
receiving quadrature amplitude modulation (QAM) modulated samples representing the uplink signal to be transmitted;
performing DFT precoding of the received QAM modulated samples;
receiving an interlace pattern;
performing a resource block (RB) to subcarrier mapping of the DFT precoded samples using the received interlace pattern to obtain a vector of subcarriers; and
inputting the obtained vector of subcarriers to perform an inverse Fast Fourier Transformation for low cubic metric (CM)/peak to average power ratio (PAPR) transmissions.

5. The method of claim 4, wherein the interlacing is performed based on resources that are clustered according to a periodic, or block-wise periodic, interlacing pattern.

6. The method of claim 5, wherein the interlacing pattern comprises uniformly spread resource block (RB) interlaces.

7. A network node for a wireless communication network, the network node comprising control circuitry configured to:
perform interlacing by performing clustered Discrete Fourier Transform (DFT) spread Orthogonal Frequency Division Multiplexing (OFDM) (DFT-S-OFDM) modulation for an uplink signal to be transmitted in an unlicensed frequency band;
receive quadrature amplitude modulation (QAM) modulated samples representing the uplink signal to be transmitted;
perform DFT precoding of the received QAM modulated samples;
receive an interlace pattern;
perform a resource block (RB) to subcarrier mapping of the DFT precoded samples using the received interlace pattern to obtain a vector of subcarriers; and
input the obtained vector of subcarriers to perform an inverse Fast Fourier Transformation (IFFT) for low cubic metric (CM)/peak to average power ratio (PAPR) transmissions.

8. The network node of claim 7, wherein the control circuitry is configured to perform the interlacing based on resources that are clustered according to a periodic, or block-wise periodic, interlacing pattern.

9. The network node of claim 8, wherein the interlacing pattern comprises uniformly spread resource block (RB) interlaces.

* * * * *